United States Patent [19]

Peterson

[11] Patent Number: 4,688,667
[45] Date of Patent: Aug. 25, 1987

[54] ATTACHMENT FOR CEMENT CHUTE

[76] Inventor: James C. Peterson, 8718 Riley Rd., Wonder Lake, Ill. 60097

[21] Appl. No.: 791,059

[22] Filed: Oct. 24, 1985

[51] Int. Cl.[4] .............................................. B65G 11/00
[52] U.S. Cl. .................................... 193/10; 193/2 A; 193/21; 366/68
[58] Field of Search ..................... 193/10, 2 A, 2 R, 4, 193/20, 21, 32, 25 R, 25 S; 366/68; 222/528, 529

[56] References Cited

U.S. PATENT DOCUMENTS

| 779,590 | 1/1905 | Dugan | 193/2 R X |
|---|---|---|---|
| 1,078,931 | 11/1913 | Marshall | 193/25 R |
| 1,251,397 | 12/1917 | MacLauchlan . | |
| 1,654,043 | 12/1927 | Graham . | |
| 1,733,118 | 10/1929 | Eddy . | |
| 2,601,449 | 6/1952 | Nicholson | 193/10 X |
| 2,734,611 | 2/1956 | Gordon | 193/25 R X |
| 3,068,981 | 12/1962 | Stegmeier et al. . | |
| 3,249,192 | 5/1966 | Buskirk | 193/4 |
| 3,371,826 | 3/1968 | Speno . | |
| 3,499,557 | 3/1970 | Walzel . | |
| 3,746,140 | 7/1973 | Shiffelbein | 193/10 X |
| 4,273,231 | 6/1981 | Hodneland | 366/68 X |
| 4,372,730 | 2/1983 | Ladt . | |
| 4,458,800 | 7/1984 | Christensen . | |

Primary Examiner—Andres Kashnikov
Assistant Examiner—Daniel R. Edelbrock
Attorney, Agent, or Firm—Mathew R. P. Perrone

[57] ABSTRACT

The chute attachment is attached to a chute on cement truck at a receiving end so that cement might flow through the receiving end to an outlet end having a reduced size compared to the receiving end and into the desired place. A closure assembly is provided to close the chute attachment to thereby cut off the flow of cement, and minimize or avoid any spillage. The chute attachment has a frame which includes a circular assembly having large, middle and small circular members. The members are secured together at a common tangential point and a cover is secured to the frame.

12 Claims, 11 Drawing Figures

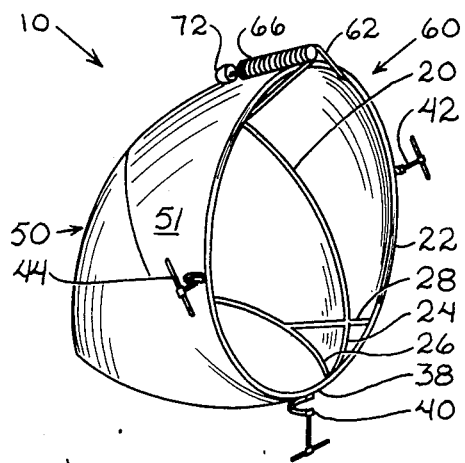
Fig. I
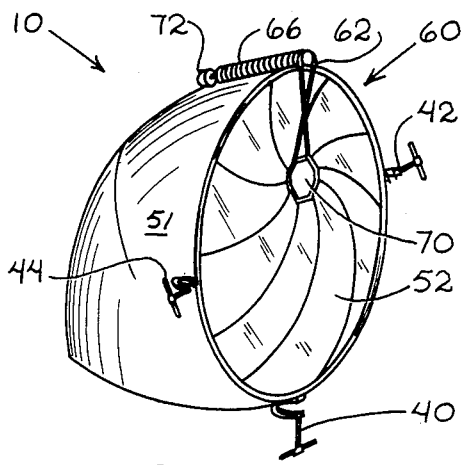
Fig. II
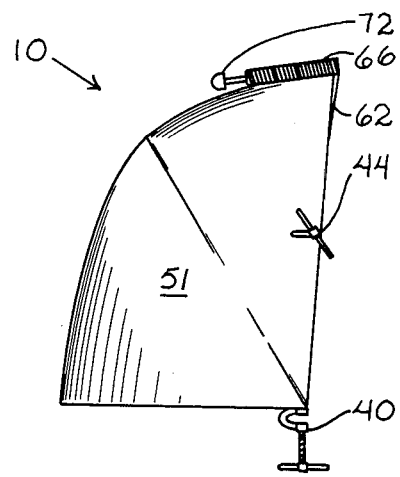
Fig. III
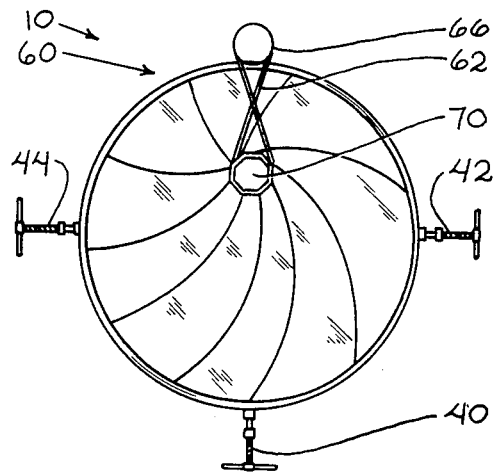
Fig. IV
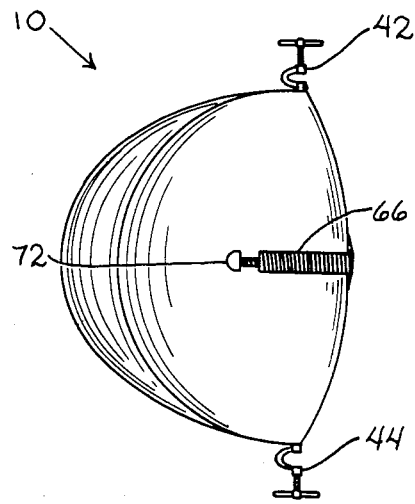
Fig. V
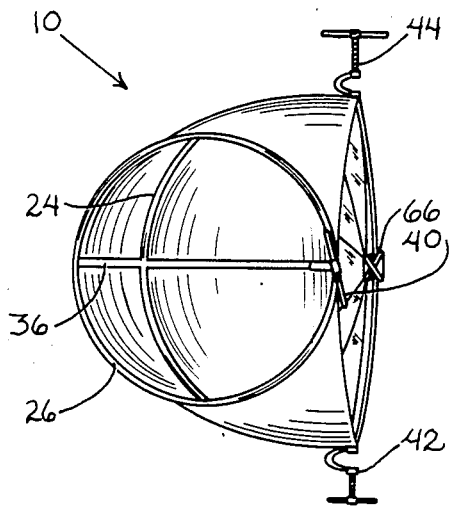
Fig. VI

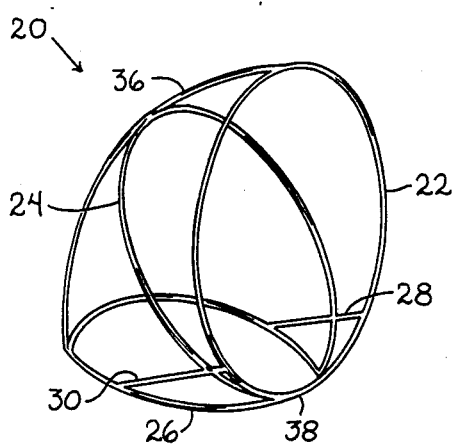
Fig. VII
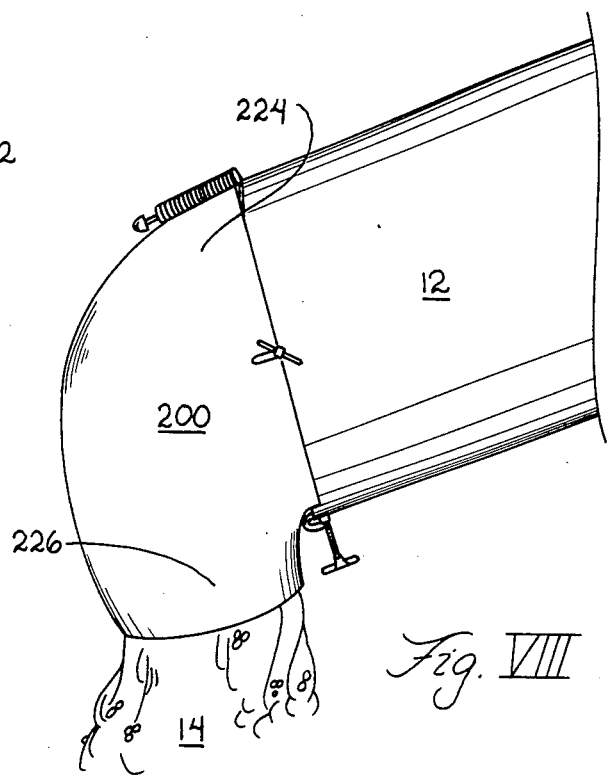
Fig. VIII
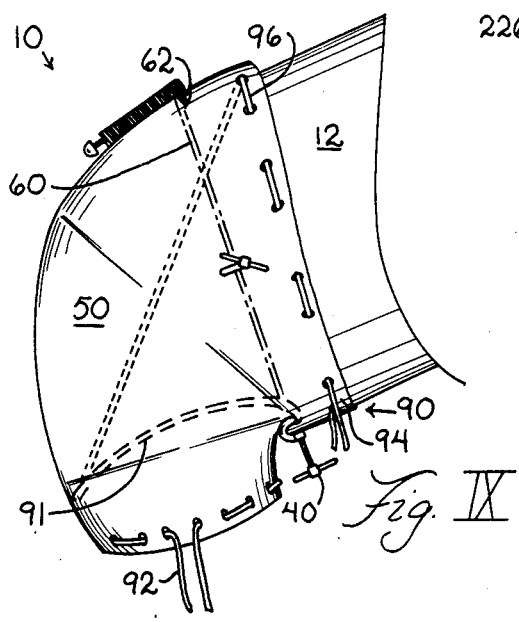
Fig. IX
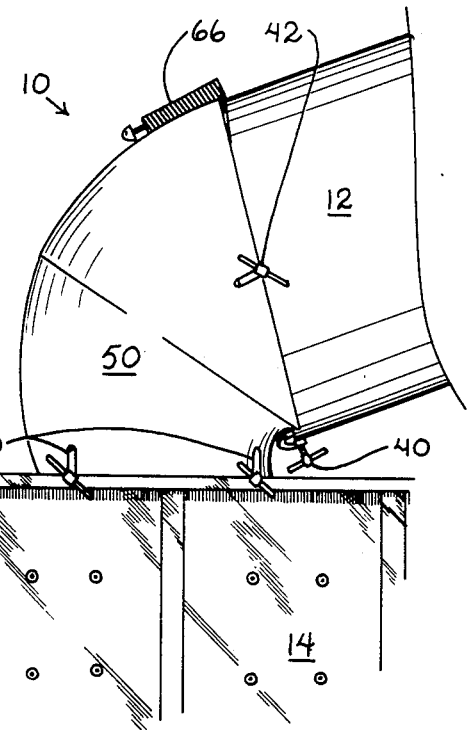
Fig. X
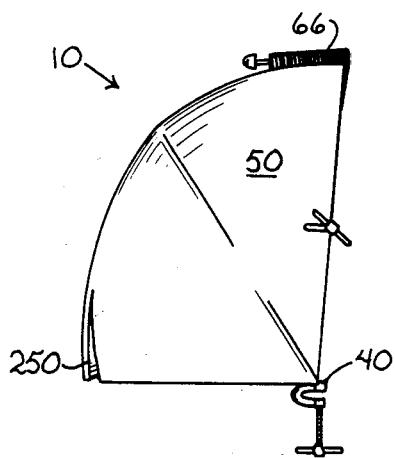
Fig. XI

ATTACHMENT FOR CEMENT CHUTE

BACKGROUND OF THE INVENTION

This invention relates to an attachment for a cement chute and more particularly to an attachment for a cement chute capable of directing the flow of cement and cutting off the flow of cement at the appropriate time, while avoiding or minimizing waste of the cement.

Since the Romans discovered the use of cement for construction purposes, great uses for this extremely valuable material are clearly possible. This material greatly simplifies construction processes. Because this application is directed to material flow—especially as it relates to cement or concrete—cement and concrete are used interchangeably.

One of the great improvements over the Roman method of making concrete is the use of the cement truck. The Roman hand method of mixing cement was used until the development machines, such as the cement truck. The cement truck provides the mix of the cement at the job site and helps to form the mix during transit. The power applied cement making cylinder attached to the truck provides for greater use of cement, in that the cement may be more easily transported, while at the same time being appropriately mixed to achieve the desired consistency in resulting mixture.

Typically these trucks have chutes which are used to dispense the concrete from the mixing apparatus. One of the problems with the use of the chute has been to achieve cutting off the flow of the cement at the appropriate time while accomplishing this cut off efficiently. At the same time, it is highly desired to be able to direct the flow of the cement to the desired point efficiently. This at times is an extremely difficult process because of the weight and consistency of the cement. In fact, some devices designed to accomplish these desired results simply do not work. Even if a workable device is obtained, the weight and force of the cement can sometimes jam a chute closing device such that the device does not work efficiently.

Another major problem with delivering cement is the difficulty of directing or focusing the cement to the exact place of desired delivery. This is especially difficult if the space is somewhat confined. Typical of the confined spaces are footings, wall forms, masonry block cells, wall framings, casting molds or other confined places. While these forms are very useful, they are difficult to make. The tight space confines in these and other closely confined areas lead to great difficulties.

An additional advantage to a cement chute attachment is achieved if the cement chute attachment can be secured to a variety of different types of chutes. In this fashion the cement chute attachment could be removed from one chute to another without the neccessity of having the plurality of chute attachments in stock.

It is required to efficiently stop the flow of cement from the chute because material is otherwise wasted and cleanup of the wasted material is a major problem. It thus becomes critical to provide a device, which avoids wasting material and assists in the directing of the material flow. Clearly, there are a substantial number of problems to be solved in order to use cement more efficiently. If a simplified delivery and direction system can be developed, cement or concrete can become even more useful than presently recognized.

SUMMARY OF THE INVENTION

Therefore, it is an object of this invention to provide a chute attachment for a concrete mixer.

A further object of this invention is to provide an attachment for efficiently closing a chute for a concrete mixer.

A still further object of this invention is to provide a chute attachment for directing the flow of concrete from a chute of a concrete mixer.

Yet a further object of this invention is to provide a chute attachment which will permit filling of masonry block walls.

Also an object of this invention is to provide a chute attachment which will permit filling of confined spaces with cement.

Another object of this invention is to provide a chute attachment which can be fitted to a variety of cement chutes.

These and other objects (which other objects become clear by consideration of the specification, claims, and drawings as a whole) are met by providing, a chute attachment in the form of an arcuate cap for a chute capable of being sealably attached to the end of a chute and closeable with an eye-type closure.

BRIEF DESCRIPTION OF THE DRAWING

FIG. I depicts a perspective view of chute attachment 10.

FIG. II depicts a perspective view of chute attachment 10 with eye closure 60 in a closed position.

FIG. III depicts a side view of FIG. I.

FIG. IV depicts a front view of FIG. II.

FIG. V depicts a top view of FIG. I.

FIG. VI depicts a bottom view of FIG. II.

FIG. VII depicts a perspective view of frame 20.

FIG. VIII depicts a side view of molded chute attachment 200 secured to concrete dispensing chute 12.

FIG. IX depicts a side view of chute attachment 10 secured to concrete dispensing chute 12 with chute seal 90 added thereto.

FIG. X depicts an elongated chute attachment 10 with wall clamps 120 for directing cement into a wall frame 14.

FIG. XI depicts chute 10 with slot 250 in cover 50.

Throughout the specification where the same part appears in more than one figure of the drawing, the same number is applied to that part.

DESCRIPTION OF THE PREFERRED EMBODIMENTS

The chute attachment of this invention is attached to a chute at a receiving end so that cement might flow through the receiving end to an outlet end having a reduced size compared to the receiving end and into the desired place. The chute attachment may be molded or framed. In one embodiment, a wire frame with a flexible cover covering portions of the wire frame forms the chute attachment. The wire frame is opened at one end for attachment to a chute of a concrete truck and open at the other end for the purpose of directing the flow of the concrete through the attachment. A closure assembly is provided to close the chute attachment to thereby cut off the flow of cement, and minimize or avoid any spillage.

Referring now to FIG. I and FIG. VII, chute attachment 10 includes a frame 20. Frame 20 includes a large frame circle 22, a middle frame circle 24, a small frame circle 26, a first straight brace 28, a second straight brace 30, and arched brace 36. Large frame circle 22, is secured to chute 12 shown in FIG. X of a cement truck (not shown). Middle frame circle 24 and small frame circle 26 are secured to large frame circle 22 at joinder 38 in a tangential fashion.

Supporting frame 20 are first straight brace 28 and second straight brace 30. First straight brace 28 and second straight brace 30 are generally oppositely disposed to each other and secured tangential to each of large frame circle 22, middle frame circle 24, and small frame circle 26. First straight brace 28 and second straight brace 30 are each also about twenty (20°) degrees to 100° from joinder 38. More preferrably, first straight brace 28 and second straight brace 30 are each about twenty five (25°) degrees to seventy (70°) degrees from joinder 38. Thus, the frame 20 is set with adequate support. Most preferrably, first straight brace 28 and second straight brace 30 are each about thirty (30°) degrees to fifty (50°) degrees from joinder 38. Thus, the frame 20 is set with adequate support.

Arch brace 36 is bent so that it is tangential to each of middle circle 24, small frame circle 26, and large frame circle 22 at the points where the edge of the circle is substantially separated from each other. Such securing is made by welding or other suitable means. Arch brace 36 is generally diametrically opposed to circle joinder 38 and indicates a top of chute attachment 10.

Referring now to FIG. I, FIG. III, and FIG. V; secured to the joinder 38 of the circles, is a first clamp 40. Second clamp 42 and third clamp 44 are secured to large circle 22 at substantially about ninety (90°) degree arcs from first clamp 40. Thus, second clamp 42 and third clamp 44 are substantially diametrically opposed to each other. These clamps serve to attach the chute attachment 10 to the chute 12 of the cement truck (not shown).

The chute frame 20 has a flexible cover 50. Flexible cover 50 includes hood 51 to cover and frame most of large circle 22, but for a substantially equal section on either side around circle joinder 38. Hood 51 also covers about 220° to about 300° of large circle 22, middle circle 24 and small frame circle 26. More preferably, hood 51 covers 230° to 290°. Most preferrably, hood 51 covers 240° to 280°. Any cement or concrete is still free to pass through chute attachment 10 by passing through large frame circle 22, which is attached direclty to the chute 12. The cement then passes middle circle 24 and then through small frame circle 26. Hood 51 assists in directing the flow of cement or concrete.

Referring now to FIG. I, FIG. II, FIG. IV, and FIG. V, for the purpose of substantially and completely closing large circle 22, eye closure 60 is secured thereto. Eye flap 52 appears in the mouth of the chute secured to the frame as apart of the cover 50 and is activated by pulling on a rope 62 secured to the control 66 of the eye closure 60. By pulling on the rope, the eye flap 52 is raised and the cement flow is slowed prior to having the eye closure 60 shut.

In FIG. I, eye closure 60 is shown in an open position with eye flap 52 folded within the chute attachment 10. Control 66 is oppositely disposed from first clamp 40 on large frame circle 22 and is rotatably secured to large frame circle 22. Rotation of the control 66 opens eye flap 52 or closes eye flap 52.

Referring now to FIG. II and FIG. IV, FIG. II is substantially similar to FIG. I but for the fact that eye flap 52 is shown in closed position. Rope 62 is connected to control 66 and the center 70 of eye flap 52 in order to permit eye flap 52 to close like the iris of an eye and prevent spillage.

FIG. III is side view of FIG. II depicting control knob 72 of control 66 for the purpose of rotatably moving control 66 to open or close eye flap 52.

FIG. VI is bottom view of FIG. II showing more clearly arch brace 36 FIG. VII depicts frame 20 without cover 50. In this fashion, the first brace 28 and second brace 30 are shown to strengthen frame 20 in combination with arch brace 36.

FIG. VIII shows elongated, molded chute attachment 200 attached to a concrete or cement dispensing chute 12 of a standard cement mixing truck (the truck not being shown). Cement 14 is pouring out the chute in the desired direction thanks to the presence of molded chute attachment 200. Molded chute attachment 200 is similar to chute attachment 10. However, molded chute attachment 200 is formed of molded plastic or other suitable material for resisting the cement flow. Appropriate materials and molding methods become clear in view of this disclosure.

In this fashion, molded chute 200 can achieve the desired shape without the use of the frame 20 or the cover 50. The frame 20 may be molded into the molded chute 200 if desired, or omitted. Basically, the molded chute 200 is just molded to the desired shape of the molded chute 200 with the narrower portion down below to achieve the desired flow rates of the frame and the cover system. The chute attachment side 224 of the molded chute 200 is shaped similar to large circle side of chute attachment 10. The cement dispensing side 226 of molded chute 200 is shaped to correspond to the small circle side of chute attachment 10. In this fashion, the molded chute 200 may be more simply made than chute attachment 10.

Molded chute attachment 200 may be provided with an elongated portion for chute dispensing side 226. Chute dispensing side 226 provides for even more concise directing of the flow of cement. Chute dispensing side 226 may be made even longer to allow for pouring of footings. Frame chute 10 may also be so extended if desired.

FIG. IX depicts the cover 50 with sealing flap 90 secured thereto. Sealing flap 90 is made of material similar to cover 50. Sealing flap 90 is secured adjacent joinder 38 so as to partially close small frame circle 26 with circle blocking portion 91 of sealing flap 90. Blocking portion 91 combines with chute covering portion 94 to form sealing flap 90. Blocking portion 91 of sealing flap 90 works with chute covering portion 94. Sealing flap 90 thus extends under chute 12 at chute covering portion 94. Chute covering portion 94 is tied in a sealed relationship to chute 12 by a chute rope 96. Of course, sealing flap 90 may also be secured in another suitable fashion.

The blocking portion 91 of sealing flap 90 also provides the means for directing the amount of cement in a narrow stream to the desired particular location by tightening drawstring closure 92. In this fashion, frames for basement walls or similar structures or holes in cement blocks can be filled.

Eye closure 60 as shown in FIG. I is combined in FIG. IX to cooperate as a part of sealing flap 90. Eye closure 60 is activated by pulling up eye rope 62 to partially close the chute 12 prior to activating drawstring closure 92. Sealing flap 90 is glued or otherwise secured near first clamp 40. The sealing flap 90 reaches under and completely seals the chute 12 and provides a sealing mechanism to avoid splashback of the concrete under the chute 12. Sealing flap 90 is tied to chute 12 with chute rope 96. Chute rope 96 is secured to sealing flap 90 in a drawstring fashion. Both eye closure flap 52 and blocking portion 91 of sealing flap 90 are foldable such that the flap 90 may be bent down to permit the free flow of concrete. In this fashion, the desired results may be obtained.

Referring now to FIG. X, chute attachment 10 is shown as secured to chute 12. Additionally, wall clamps 120 are shown as secured to frame 20 at small circle 26. In this fashion, wall clamps 120 can be secured to wall frame 14 to hold the chute attachment 10 to the wall boards 124. In this manner, the wall frame 14 can receive cement in an appropriate fashion. Wall frame 14 forms a frame to hold cement, which in turn forms a wall. The wall clamps 120 assure that the chute will remain secured to the wall and at the cement will be directed into the wall frame 14.

Referring now to FIG. XI, chute 10 is shown as being modified by having a slot 250 in cover 50. Slot 250 appears diametrically opposed to clamp 40 in cover 50. Slot 250 begins at the small circle 26 and extends upward approximately half way to middle circle 24. Slot 250 assists in the direction of cement along a narrow line. This permits the cement to directed to the wall effectively.

Any suitable material may be used to make chute 10 or molded chute 200. It is clear that the material must be durable and able to withstand the pounding of cement use. It is furthermore clear that the frame 20 of chute 10 must be secured by welds or similar means, and that such securing must be strong enough to support the chute 10 in its desired use. Also flexible cover 50 is secured to other flexible parts by sewing, gluing or other suitable means. Flexible parts of the device herein may be secured to the rigid parts such as frame 20 by gluing, sewing or similar methods as are known in the art. Such determinations of the strength and type of materials desired to be used can easily be made in view of the disclosure of this invention.

Because of this disclosure and solely because of this disclosure, various modifications to the attachment for the cement chute disclosed and claimed herein can become clear to those having ordinary skill in the art. Such modifications are clearly covered hereby.

What is claimed and sought to be secured by Letters Patent of the United States is:

1. A chute attachment for directing a flow of cement from a chute, wherein said chute attachment includes a frame, and a flexible cover for said frame, further wherein:
   a. said frame includes a receiving end for attachment to said chute and an outlet end for cement passage to a desired point;
   b. said flexible cover is secured to said frame;
   c. an attaching means is secured to said frame for attaching said frame to said chute;
   d. a closure assembly is provided for said chute attachment to stop said flow;
   e. said frame includes a circular assembly having a large circular member, a middle circular member and a small circular member;
   f. said large circular member, said middle circular member and said small circular member are secured together at a common tangential point;
   g. said large circular member has a larger diameter than said middle circular member;
   h. said middle circular member has a larger diameter than said small circular member; and
   i. said middle circular member is between said large circular member and said small circular member.

2. The chute attachment of claim 1 wherein:
   a. said chute attachment is attached to said chute at said large circular member;
   b. said chute attachment has an outlet at said small circular member; and
   c. a brace assembly is secured to said circular assembly for supporting said circular assembly and is included with said frame.

3. The chute attachment of claim 2 wherein:
   a. said brace assembly includes a first straight brace, a second straight brace, and an arched brace;
   b. said arched brace is tangentially secured to said large circular member, said middle circular member and said small circular member and oppositely disposed from said common tangential point;
   c. said first straight brace and said second straight brace are tangentially secured to said large circular member, said middle circular member and said small circular member; and
   d. said first straight brace and said second straight brace are oppositely disposed from each other and about 20° to 100° of arc length from said common tangential point.

4. The chute attachment of claim 3 wherein said first straight brace and said second straight brace are about thirty degrees to fifty degrees of arc length from said common tangential point.

5. The chute attachment of claim 4 wherein:
   a. said attachment means includes a first clamp, a second clamp, and a third clamp secured to said large circle;
   b. said first clamp is secured at said common tangential point;
   c. said second clamp and said third clamp are secured at about seventy degrees to about one hundred degrees from said first clamp along said large circular member; and
   d. said second clamp is oppositely disposed from said third clamp.

6. The chute attachment of claim 5 wherein said second clamp and said third clamp are secured at about ninety degrees from said first clamp along said large circular member.

7. The chute attachment for claim 5 wherein:
   a. said flexible cover is secured to said circle assembly of said frame; and
   b. said flexible cover includes a hood covering about 240° to about 280° of arc length of said circle assembly.

8. The chute attachment of claim 5 wherein in a closure flap is secured at said large circle.

9. The chute attachment of claim 8 wherein a blocking flap is movably secured with said cement outlet.

10. The chute attachment of claim 9 wherein at least one wall clamp is secured to said small circle to direct said cement into a wall frame.

11. The chute attachment of claim 10 wherein:
   a. a slot is in said cover adjacent said small circle and oppositely disposed from said joinder; and
   b. said slot is perpendicular to the plane of said small circle; and c. said slot extends from said small circle up to about halfway to said middle circle.

12. The chute attachment of claim 1 wherein:

a. a slot is in said cover adjacent said small circle and oppositely disposed from said common tangential point; and b. said slot is perpendicular to the plane of said small circle; and c. said slot extends from said small circle up to about halfway to said middle circle.

* * * * *